US010973079B2

(12) United States Patent
Fujishiro et al.

(10) Patent No.: US 10,973,079 B2
(45) Date of Patent: Apr. 6, 2021

(54) RADIO TERMINAL AND BASE STATION

(71) Applicant: KYOCERA CORPORATION, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 97 days.

(21) Appl. No.: 15/771,647

(22) PCT Filed: Oct. 28, 2016

(86) PCT No.: PCT/JP2016/081998
§ 371 (c)(1),
(2) Date: Apr. 27, 2018

(87) PCT Pub. No.: WO2017/077950
PCT Pub. Date: May 11, 2017

(65) Prior Publication Data
US 2018/0317278 A1    Nov. 1, 2018

Related U.S. Application Data

(60) Provisional application No. 62/251,878, filed on Nov. 6, 2015.

(51) Int. Cl.
*H04W 76/30* (2018.01)
*H04W 92/18* (2009.01)
(Continued)

(52) U.S. Cl.
CPC .......... *H04W 76/30* (2018.02); *H04W 8/005* (2013.01); *H04W 48/08* (2013.01); *H04W 76/27* (2018.02);
(Continued)

(58) Field of Classification Search
None
See application file for complete search history.

(56) References Cited

U.S. PATENT DOCUMENTS

2016/0094975 A1*  3/2016  Sheng ................. H04W 72/042
                                                          370/216
2016/0135244 A1*  5/2016  Chen .................... H04W 76/14
                                                          370/329
(Continued)

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V13.1.0; Sep. 2015; pp. 1-254; Release 13; 3GPP Organizational Partners.

(Continued)

*Primary Examiner* — Faruk Hamza
*Assistant Examiner* — Alan L Lindenbaum
(74) *Attorney, Agent, or Firm* — Studebaker & Brackett PC

(57) ABSTRACT

A radio terminal according to an embodiment includes: a controller configured to set a sidelink gap for executing a sidelink operation at a frequency to which a neighbor cell different from a serving cell belongs; and a transmitter configured to transmit, to the serving cell, a predetermined message for indicating that the radio terminal is not interested in the sidelink operation or a measurement report related to a radio environment of the radio terminal. If the predetermined message or the measurement report is transmitted, the controller autonomously releases the sidelink gap configuration even if a message for releasing the sidelink gap configuration is not received from the serving cell.

9 Claims, 6 Drawing Sheets

(51) Int. Cl.
*H04W 76/27* (2018.01)
*H04W 8/00* (2009.01)
*H04W 48/08* (2009.01)
H04W 24/10 (2009.01)
H04W 88/04 (2009.01)
H04W 4/70 (2018.01)
H04W 84/04 (2009.01)

(52) U.S. Cl.
CPC .............. *H04W 92/18* (2013.01); *H04W 4/70* (2018.02); *H04W 24/10* (2013.01); *H04W 84/042* (2013.01); *H04W 88/04* (2013.01)

(56) References Cited

U.S. PATENT DOCUMENTS

| | | | |
|---|---|---|---|
| 2017/0048922 A1* | 2/2017 | Lee | H04W 76/38 |
| 2018/0132297 A1* | 5/2018 | Li | H04W 76/23 |
| 2018/0167988 A1* | 6/2018 | Jung | H04W 8/005 |

OTHER PUBLICATIONS

Kyocera; Further details of sidelink gap for direct discovery; 3GPP TSG-RAN WG2 #91bis; R2-154680; Oct. 5-9, 2015; pp. 1-8; Malmo, Sweden.

* cited by examiner

RADIO TERMINAL AND BASE STATION

TECHNICAL FIELD

The present application relates to a radio terminal and a base station used in a communication system.

BACKGROUND ART

In 3GPP (3rd Generation Partnership Project), which is a project aiming to standardize a mobile communication system, the specifications of a proximity based service (ProSe) have been designed.

In the ProSe, a direct discovery (ProSe Direct Discovery) and a direct communication (ProSe Direct Communication) are defined.

The direct discovery is an operation for discovering another radio terminal present in the proximity of a radio terminal. The direct communication is an operation for communicating on a direct device-to-device interface. The direct discovery and the direct communication configure a sidelink (sidelink operation).

PRIOR ART DOCUMENT

Non-Patent Document

Non Patent Document 1: 3GPP Technical Report "TS 36.300 V13.1.0" Sep. 24, 2015

SUMMARY OF THE INVENTION

A radio terminal according to one embodiment is configured to be capable of executing a sidelink operation in which a direct device-to-device interface is used. The radio terminal comprises a controller configured to set a sidelink gap for executing the sidelink operation at a frequency to which a neighbor cell different from a serving cell belongs; and a transmitter configured to transmit, to the serving cell, a predetermined message indicating that the radio terminal is not interested in the sidelink operation or a measurement report related to a radio environment of the radio terminal. If the predetermined message or the measurement report is transmitted, the controller is configured to autonomously release the sidelink gap configuration even if a message for releasing the sidelink gap configuration is not received from the serving cell.

A base station according to one embodiment comprises a controller configured to set, to a radio terminal, a sidelink gap for executing a sidelink operation in which a direct device-to-device interface is used at a frequency to which a neighbor cell different from a serving cell belongs; and a receiver configured to receive, from the radio terminal, a predetermined message for indicating that the radio terminal is not interested in the sidelink operation or a measurement report related to a radio environment of the radio terminal. If the predetermined message or the measurement report is received, the controller is configured to determine that the sidelink gap configuration is released without transmitting a message for releasing the sidelink gap configuration to the radio terminal.

A radio terminal according to one embodiment is configured to be capable of executing a sidelink operation in which a direct device-to-device interface is used. The radio terminal comprises a controller configured to set a sidelink gap for executing the sidelink operation at a frequency to which a neighbor cell different from a serving cell belongs; and a transmitter configured to transmit, if conditions for transmitting a measurement report related to a radio environment of the radio terminal are satisfied, the measurement report to the serving cells even during the sidelink gap.

DESCRIPTION OF THE EMBODIMENT

Overview of Embodiments

Figure 1:
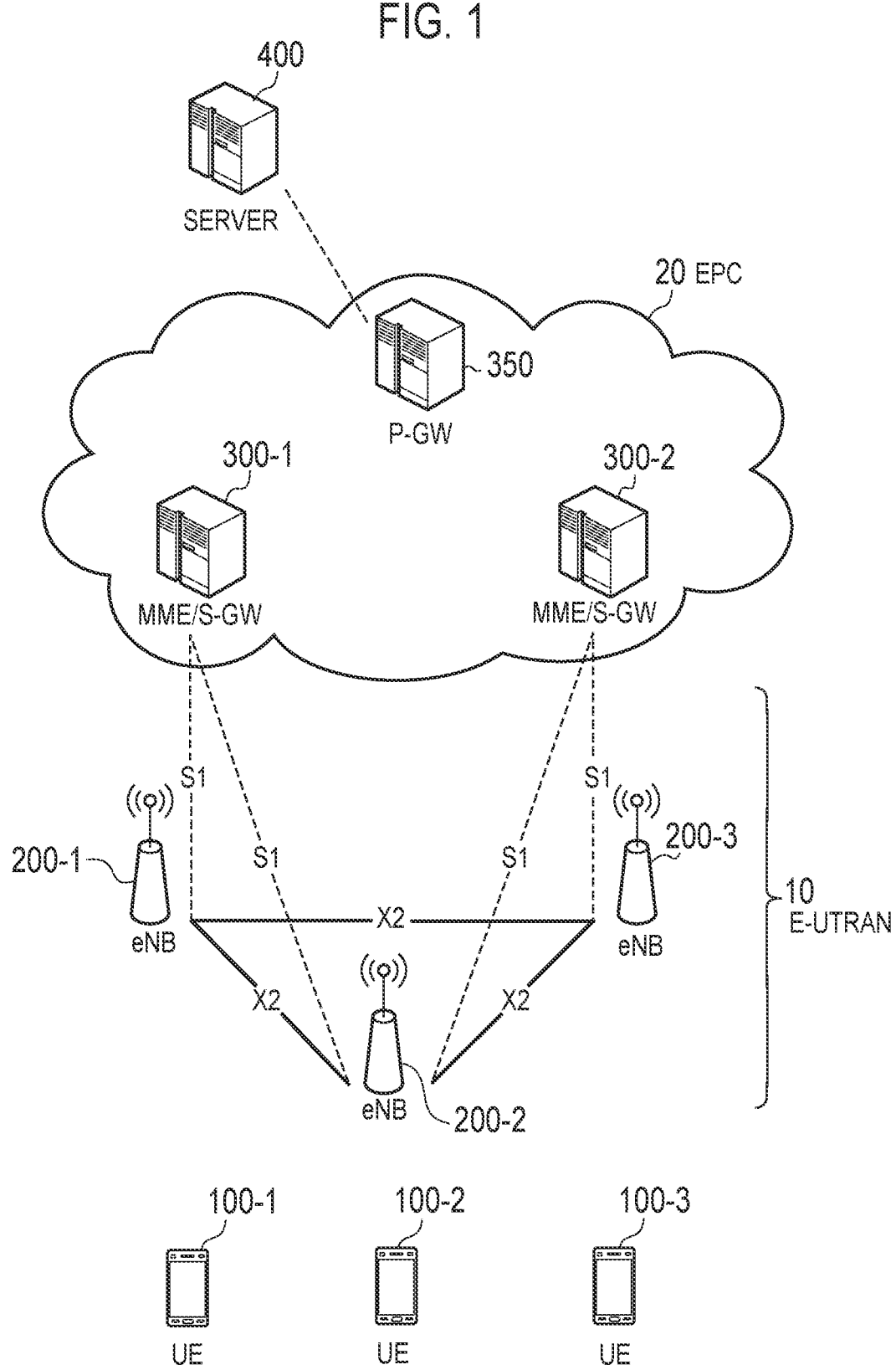
FIG. 1 is a diagram illustrating a configuration of an LTE system.

A radio terminal according to embodiments is configured to be capable of executing a sidelink operation in which a direct device-to-device interface is used. The radio terminal comprises a controller configured to set a sidelink gap for executing the sidelink operation at a frequency to which a neighbor cell different from a serving cell belongs; and a transmitter configured to transmit, to the serving cell, a predetermined message indicating that the radio terminal is not interested in the sidelink operation or a measurement report related to a radio environment of the radio terminal. If the predetermined message or the measurement report is transmitted, the controller is configured to autonomously release the sidelink gap configuration even if a message for releasing the sidelink gap configuration is not received from the serving cell.

The transmitter is configured to transmit, as the predetermined message, a message not including information indicating that the radio terminal is interested in the sidelink operation.

The transmitter is configured to transmit, as the predetermined message, a message not including information related to a radio resource requested by the radio terminal for the sidelink operation.

The transmitter is configured to transmit, as the predetermined message, a message including information indicating a release of the sidelink gap.

The transmitter is configured to transmit, to the serving cell, a scheduling request for transmitting the measurement report. When the scheduling request is transmitted, the controller autonomously releases the sidelink gap configuration.

When the measurement report is transmitted, the controller is configured to start monitoring a control signal transmitted from the serving cell.

The controller is configured to set a plurality of sidelink gaps corresponding to frequencies different from each other. The transmitter is configured transmit, as the predetermined message, a message including information for determining a frequency at which the radio terminal is not interested in the sidelink operation. The controller is configured to autonomously release a configuration of a sidelink gap corresponding to a frequency at which the radio terminal is not interested in the sidelink operation, out of the plurality of the sidelink gaps.

The controller is configured to set a plurality of sidelink gaps corresponding to PLMNs (Public Land Mobile Networks) different from each other. The transmitter is configured transmit, as the predetermined message, a message including information for determining a PLMN in which the radio terminal is not interested in the sidelink operation. The controller is configured to autonomously release a configuration of a sidelink gap corresponding to a PLMN in which the radio terminal is not interested in the sidelink operation, out of the plurality of sidelink gaps.

A base station according to the embodiments comprises a controller configured to set, to a radio terminal, a sidelink gap for executing a sidelink operation in which a direct device-to-device interface is used at a frequency to which a neighbor cell different from a serving cell belongs; and a receiver configured to receive, from the radio terminal, a predetermined message for indicating that the radio terminal is not interested in the sidelink operation or a measurement report related to a radio environment of the radio terminal. If the predetermined message or the measurement report is received, the controller is configured to determine that the sidelink gap configuration is released without transmitting a message for releasing the sidelink gap configuration to the radio terminal.

If a handover instruction for handing over the radio terminal based on the measurement report is not transmitted after receiving the measurement report, the controller is configured to transmit, to the radio terminal, information for setting the sidelink gap to the radio terminal.

A radio terminal according to the embodiments is configured to be capable of executing a sidelink operation in which a direct device-to-device interface is used. The radio terminal comprises a controller configured to set a sidelink gap for executing the sidelink operation at a frequency to which a neighbor cell different from a serving cell belongs; and a transmitter configured to transmit, if conditions for transmitting a measurement report related to a radio environment of the radio terminal are satisfied, the measurement report to the serving cells even during the sidelink gap.

The transmitter is configured to be prohibited to transmit user data in an uplink during the sidelink gap.

The transmitter is configured to be prohibited to transmit a transmission confirmation signal to a radio signal from the serving cell during the sidelink gap.

The transmitter is configured to transmit the measurement report to the serving cell even during the sidelink gap only if a predetermined condition out of a plurality of conditions for transmitting the measurement report related to the radio environment of the radio terminal is satisfied.

The transmitter is configured to transmit, even during the sidelink gap, the measurement report to the serving cell only if a permission is given from the serving cell.

It should be noted that the "side link operation" may be replaced with "direct discovery" or may be replaced with "direct communication".

(Mobile Communication System)

Hereafter, an LTE system which is a mobile communication system according to the embodiment will be described. FIG. 1 is a diagram showing a configuration of an LTE system.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. A server 400 is provided in an external network that is not managed by an operator of the cellular network.

The UE 100 corresponds to a radio terminal. The UE 100 is a mobile communication device. The UE 100 performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells. The eNB 200 performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area. It is noted that the "cell" is also used as a term indicating a function of performing radio communication with the UE 100.

The EPC 20 corresponds to a core network. The EPC 20 includes a plurality of MME (Mobility Management Entity)/S-GWs (Serving-Gateways) 300 and a P-GW (Packet Data Network Gateway) 350. The MME performs various mobility controls and the like for the UE 100. The S-GW performs control to transfer data. MME/S-GW 300 is connected to eNB 200 via an S1 interface. The E-UTRAN 10 and the EPC 20 constitute a network. The P-GW 350 performs control to relay the user data from the external network (and to the external network).

The Server 400 is, for example, a ProSe application server (ProSe Application Server). In this case, the Server 400 manages identifiers used in ProSe. For example, the Server 400 stores "EPC ProSe user ID" and "ProSe function ID". The Server 400 maps "application layer user ID" and "EPC ProSe user ID".

The Server 400 may have the ProSe function. The ProSe function is a logical function used for network related operation required for ProSe. The ProSe function plays a different role for each feature of ProSe. The Server 400 may be a network device having only the ProSe function.

Figure 2:
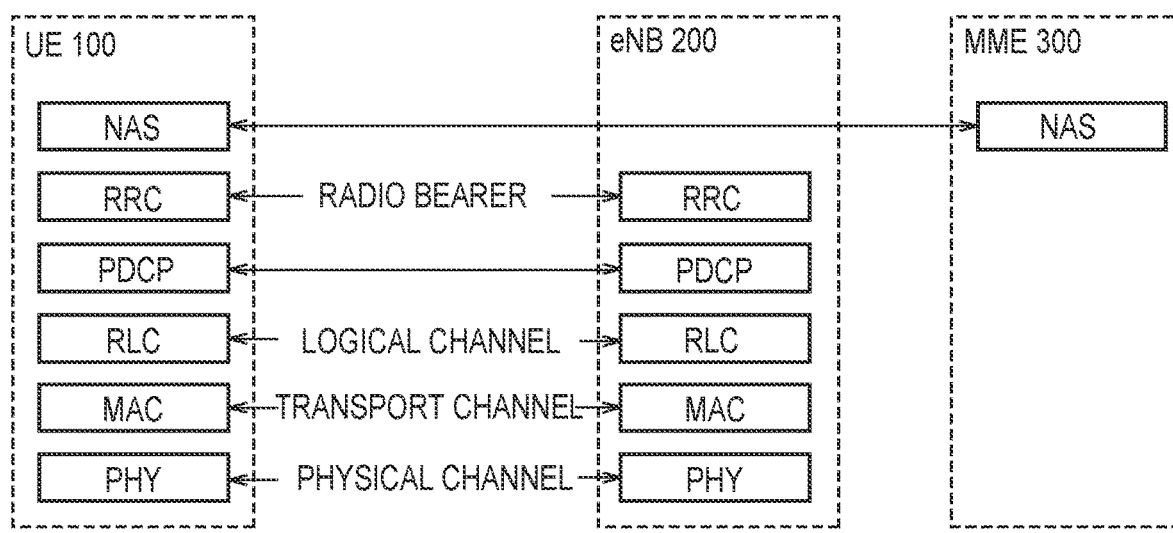
FIG. 2 is a protocol stack diagram of a radio interface in the LTE system.

FIG. 2 is a protocol stack diagram of a radio interface in the LTE system. As illustrated in FIG. 2, the radio interface protocol is classified into a layer 1 to a layer 3 of an OSI reference model. The layer 1 includes a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by hybrid ARQ (HARQ), and a random access procedure and the like. Between the MAC layer of the UE 100 and the MAC layer of the eNB 200, data and control signal are transmitted via a transport channel. The MAC layer of the eNB 200 includes a scheduler. The scheduler determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected stat (connected state). When there is not a connection between the RRC of the UE 100 and the RRC of the eNB 200, the UE 100 is in an RRC idle state (idle state).

A NAS (Non-Access Stratum) layer positioned above the RRC layer performs a session management, a mobility management and the like.

Figure 3:
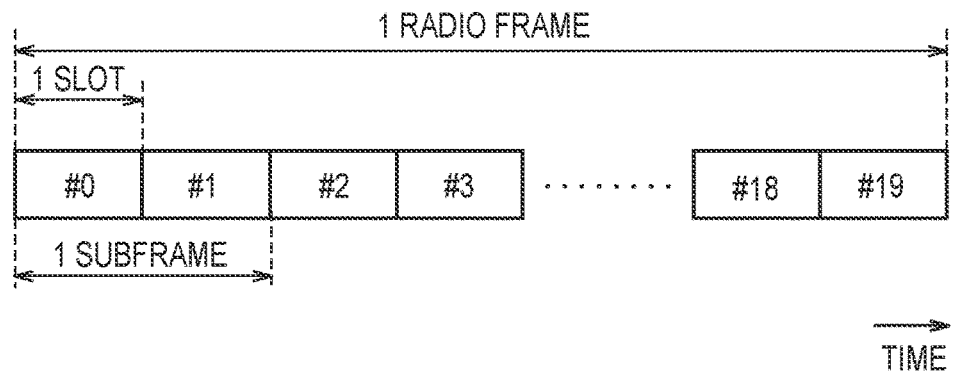
FIG. 3 is a configuration diagram of a radio frame used in the LTE system.

FIG. 3 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink.

As illustrated in FIG. 3, a radio frame is configured by 10 subframes arranged in a time direction. Each subframe is configured by two slots arranged in the time direction. Each subframe has a length of 1 ms. Each slot has a length of 0.5 ms. Each subframe includes a plurality of resource blocks (RBs) in a frequency direction (not shown). Each subframe includes a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block. Of the radio resources (time and frequency resources) assigned to the UE 100, a time resource can be identified by a subframe (or a slot).

In the downlink, a section of several symbols at the head of each subframe is a control region used as a physical downlink control channel (PDCCH) for mainly transmitting a control signal. Details of the PDCCH will be described later. Furthermore, the other portion of each subframe is a region available as a physical downlink shared channel (PDSCH) for mainly transmitting downlink data.

In the uplink, both ends in the frequency direction of each subframe are control regions used as a physical uplink control channel (PUCCH) for mainly transmitting an uplink control signal. Furthermore, the other portion of each subframe is a region available as a physical uplink shared channel (PUSCH) for mainly transmitting uplink data.

(Proximity Service)

Proximity service (ProSe) will be described. In the ProSe, a plurality of UEs 100 transmit and receive various types of signals via a direct radio link without involving the eNB 200. The direct radio link in the ProSe is called "Sidelink".

The "Sidelink" is a UE-to-UE interface for direct discovery and direct communication. The "Sidelink" corresponds to a PC5 interface. The PC5 is a reference point between UEs capable of utilizing proximity service used for the control and a user plane for direct discovery, direct communication, and UE-to-Network relay based on proximity service. The PC5 interface is a UE-to-UE interface in the ProSe.

Two modes, namely, "direct discovery" and "direct communication", are defined for modes of the ProSe.

The direct discovery is a mode of searching a partner destination by directly transmitting, between UEs, a discovery signal that does not specify a specific destination. The direct discovery is a procedure for discovering another UE in the proximity of a UE by using a direct radio signal in E-UTRA (Evolved Universal Terrestrial Radio Access) via the PC5. Alternatively, the direct discovery is a procedure adopted by a UE 100 capable of executing the proximity service for discovering another UE 100 capable of executing the proximity service by using only the capability of the two UEs 100 with the help of the E-UTRA technology. The direct discovery is supported only if a service is provided to the UE 100 by the E-UTRAN (eNB 200 (cell)). The service can be provided by the E-UTRAN if the UE 100 is either connected to the cell (eNB 200), or exists in the cell.

The resource allocation types for the transmission (announcement) of a discovery signal (discovery message) include "type 1" and "type 2 (type 2B)". In the "type 1", the UE 100 selects the radio resource. In the "type 2 (type 2B)", the eNB 200 allocates the radio resource.

A "Sidelink Direct Discovery" protocol stack includes a physical (PHY) layer, a MAC layer, and a ProSe protocol. Between the physical layer of a UE (A) and the physical layer of a UE (B), a discovery signal is transmitted via a physical channel called a physical sidelink discovery channel (PSDCH). Between the MAC layer of the UE (A) and the MAC layer of the UE (B), a discovery signal is transmitted via a transport channel called a sidelink discovery channel (SL-DCH).

The direct communication is a mode in which data is directly transmitted between UEs by specifying a specific destination (destination group). The direct communication is communication between two or more UEs capable of executing the proximity service through user plane transmission in which the E-UTRA technology is used via a path without passing through any network node.

The resource allocation types of the direct communication include "mode 1" and "mode 2". In the "mode 1", the eNB 200 specifies the radio resource of the direct communication. In the "mode 2", the UE 100 selects the radio resource of the direct communication.

A direct communication protocol stack includes a physical (PHY) layer, a MAC layer, an RLC layer, and a PDCP layer. Between the physical layer of a UE (A) and the physical layer of a UE (B), a control signal is transmitted via a physical sidelink control channel (PSCCH). Between the physical layer of the UE (A) and the physical layer of the UE (B), data is transmitted via a physical sidelink shared channel (PSSCH). A synchronization signal and the like may be transmitted via a physical sidelink broadcast channel (PSBCH). Between the MAC layer of the UE (A) and the MAC layer of the UE (B), data is transmitted via a transport channel called a sidelink shared channel (SL-SCH). Between the RLC layer of the UE (A) and the RLC layer of the UE (B), data is transmitted via a logical channel called a sidelink traffic channel (STCH).

(Radio Terminal)

Figure 4:
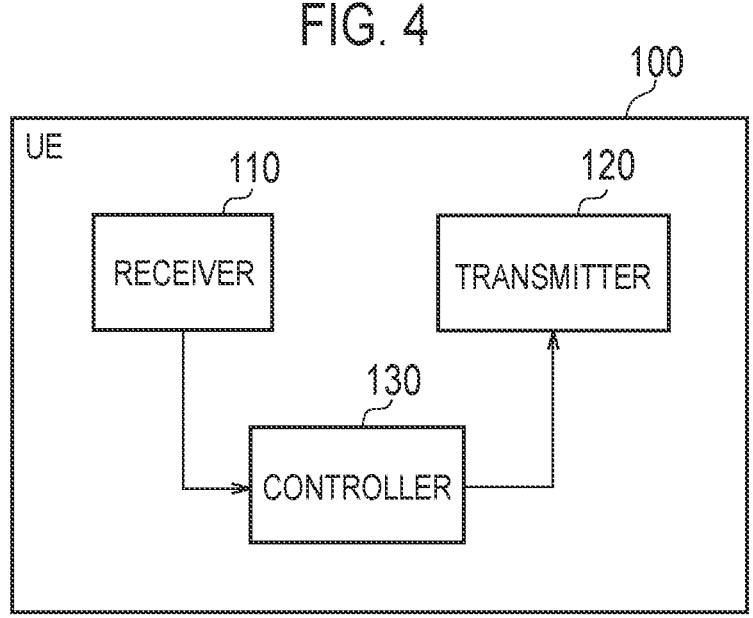
FIG. 4 is a block diagram of a UE 100.
Figure 5:
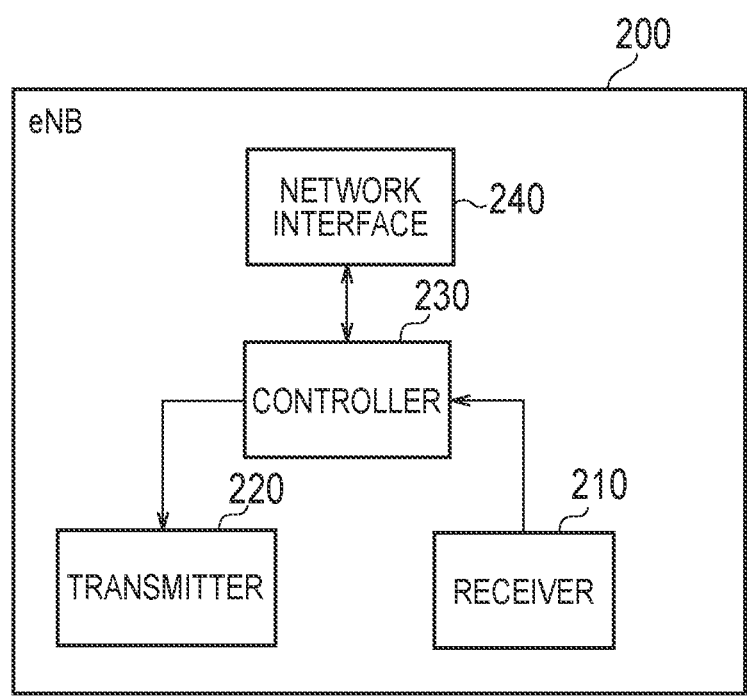
FIG. 5 is a block diagram of an eNB 200.

Hereafter, the UE 100 (radio terminal) according to the embodiment will be described. FIG. 4 is a block diagram of the UE 100. As illustrated in FIG. 5, the UE 100 includes a receiver 110, a transmitter 120, and a controller 130. The receiver 110 and the transmitter 120 may be unified as one in the form of a transceiver.

The receiver 110 performs various types of receptions under the control of the controller 130. The receiver 110 includes an antenna. The receiver 110 converts a radio signal received by the antenna into a baseband signal (reception signal). The receiver 110 outputs the baseband signal to the controller 130.

If the UE 100 is a "ProSe-enabled Public Safety UE", the receiver 110 can simultaneously receive radio signals in two different frequencies. For example, the UE 100 has two receivers 110 (2 RX Chains). The UE 100 can receive a cellular radio signal by one of the receivers 110. The UE 100 can receive a ProSe radio signal by the other receiver 110.

The transmitter 120 performs various types of transmissions under the control of the controller 130. The transmitter 120 includes an antenna. The transmitter 120 converts a baseband signal (transmission signal) output from the controller 130 into a radio signal. The transmitter 120 transmits the radio signal from the antenna.

The controller 130 performs various types of controls in the UE 100. The controller 130 includes a processor and a memory. The memory stores a program to be executed by the processor, and information to be used for a process by the processor. The processor includes a baseband processor and a CPU (Central Processing Unit). The baseband processor performs modulation and demodulation, coding and decoding, and the like, of the baseband signal. The CPU executes a program stored in the memory to perform various types of processes. The processor may include a codec that performs encoding and decoding on sound and video signals. The processor executes various types of processes described later, and various types of communication protocols described above.

The UE 100 may include a GNSS receiving equipment. The GNSS receiving equipment receives a GNSS signal to obtain location information indicating a geographical position of the UE 100. The GNSS receiving equipment outputs the received signal to the controller 130. The UE 100 may have a GPS function for acquiring the location information of the UE 100.

The below-described process (operation) executed by the UE 100 is executed by at least any one of the receiver 110, the transmitter 120, and the controller 130 included in the UE 100; however, for simplicity, it is assumed that the process is executed by the UE 100.

(Base Station)

Hereafter, the eNB 200 (base station) according to the embodiment will be described. FIG. 5 is a block diagram of the eNB 200. As illustrated in FIG. 5, the eNB 200 includes a receiver 210, a transmitter 220, a controller 230, and a network interface 240. The transmitter 210 and the receiver 220 may be unified as one in the form of a transceiver.

The receiver 210 performs various types of receptions under the control of the controller 230. The receiver 210 includes an antenna. The receiver 210 converts a radio signal received by the antenna into a baseband signal (reception signal). The receiver 210 outputs the baseband signal to the controller 230.

The transmitter 220 performs various types of transmissions under the control of the controller 230. The transmitter 220 includes an antenna. The transmitter 220 converts a baseband signal (transmission signal) output from the controller 230 into a radio signal. The transmitter 220 transmits the radio signal from the antenna.

The controller 230 performs various types of controls in the eNB 200. The controller 230 includes a processor and a memory. The memory stores a program to be executed by the processor, and information to be used for a process by the processor. The processor includes a baseband processor and a CPU (Central Processing Unit). The baseband processor performs modulation and demodulation, coding and decoding, and the like, of the baseband signal. The CPU executes a program stored in the memory to perform various types of processes. The processor executes various types of processes described later, and various types of communication protocols described above.

The network interface 240 is connected to an adjacent eNB 200 via the X2 interface. The network interface 240 is connected to the MME/S-GW 300 via the S1 interface. The network interface 240 is used in communication performed on the X2 interface, communication performed on the S1 interface, and the like.

The below-described process (operation) executed by the eNB 200 is executed by at least any one of the transmitter 210, the receiver 220, the controller 230, and the network interface 240 included in the eNB 200; however, for simplicity, it is assumed that the process is executed by the eNB 200.

First Embodiment

Figure 6:
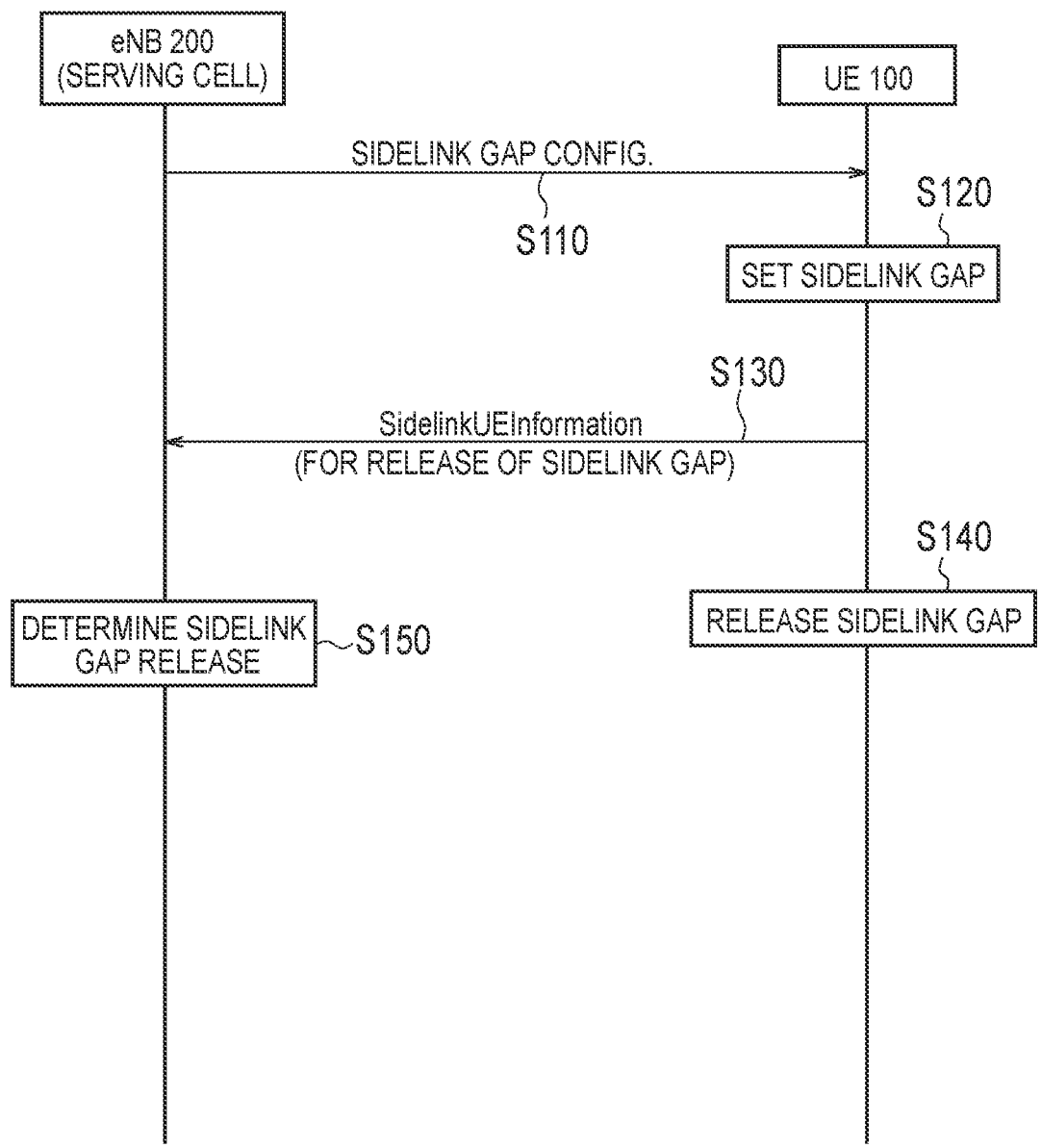
FIG. 6 is a sequence chart for describing an operation according to a first embodiment.

Next, an operation according to a first embodiment will be described by using FIG. 6. FIG. 6 is a sequence chart for describing an operation according to the first embodiment.

In FIG. 6, the UE 100 exists in a cell (serving cell) managed by the eNB 200. In the serving cell, the UE 100 is in an idle state or a connected state. Further, the UE 100 exists in a cell (neighbor cell) managed by another eNB 200. It is noted that if existing in the cell, the UE 100 is in a state capable of receiving a radio signal from the cell (eNB).

The eNB 200 operates the serving cell at a first frequency. Therefore, the serving cell belongs to the first frequency. The other eNB 200 may operate a cell (neighbor cell) at the first frequency (Intra-frequency). The other eNB 200 may operate a cell at a second frequency (Intra-frequency) different from the first frequency. The eNB 200 and the other eNB 200 may belong to an identical PLMN (Intra-PLMN). The eNB 200 and the other eNB 200 may belong to different PLMNs (Inter-PLMNs). In the following description, where necessary, an operation of the eNB 200 may be considered as an operation of a cell.

As illustrated in FIG. 6, in step S110, the eNB 200 (serving cell) transmits setting information to the UE 100. The setting information is transmitted for the eNB 200 to set, to the UE 100, a sidelink gap for the UE 100 to execute a sidelink operation at a frequency to which a neighbor cell belongs. The eNB 200 may transmit the setting information for the UE 100 to execute the sidelink operation at a frequency identical to the frequency to which the serving cell belongs. The eNB 200 may transmit the setting information for the UE 100 to execute the sidelink operation in the serving cell. The eNB 200 may transmit the setting information by an individual signaling (RRC connection reconfiguration message). The eNB 200 may transmit the setting information by a common signaling (for example, SIB (System Information Block)).

The eNB 200 may transmit, to the UE 100, the setting information, in response to a request for a sidelink gap configuration from the UE 100.

In step S120, the UE 100 sets (applies) the sidelink gap, based on the setting information.

The sidelink gap is a gap (period) for executing the sidelink operation at a frequency (Intra-frequency and/or Inter-frequency) to which a neighbor cell different from the serving cell belongs. In the sidelink gap, the UE 100 may execute the sidelink operation at a frequency (Intra-frequency) identical to the frequency to which the serving cell belongs. In the serving gap, the UE 100 may execute the sidelink operation in the serving cell. The sidelink gap may be a period during which communication with the serving cell (obligation of receiving PDCCH, for example) is exempted. The UE 100 performs the sidelink operation in the sidelink gap if receiving the sidelink gap configuration from the serving cell. The sidelink operation is an operation in which a direct device-to-device interface (PC5) is used. As the sidelink operation, the UE 100 may perform at least one operation of the direct discovery (reception (monitor) and/or transmission (announcement)) and the direct communication (reception and/or transmission).

The UE 100 executes a process of step S130 when the UE 100 is no longer interested in the sidelink operation.

In step S130, the UE 100 transmits, to the serving cell (eNB 200), a predetermined message to indicate that the UE 100 is not interested in the sidelink operation. The UE 100 can use, as the predetermined message, a SidelinkUEInformation message used to indicate sidelink information to the eNB 200, for example.

The UE 100 may transmit, as the predetermined message, a message not including information (for example, discRxInterest, and commRxInterestedFreq) indicating that the UE 100 is interested in the sidelink operation. For example, if the UE 100 is no longer interested in reception of the direct discovery, the UE 100 may transmit, as the predetermined message, a message not including information (discRxInterest) indicating that the UE 100 is interested in monitoring the announcement of the direct discovery, to the serving cell. If the UE 100 is no longer interested in reception of the direct communication, the UE 100 may transmit, as the predetermined message, a message not including information (commRxInterestedFreq) indicating a frequency at which the UE 100 is interested in the reception of the direct communication, to the serving cell.

The UE 100 may transmit, as the predetermined message, a message not including information (for example, discTxResourceReq, and commTexResourceReq) related to the radio resource requested by the UE 100 for the sidelink operation, to the serving cell. For example, if the UE 100 is no longer interested in transmission of the direct discovery (requesting transmission resource), the UE 100 may transmit, as the predetermined message, a message not including information (for example, discTxResourceReq) related to the radio resource requested by the UE 100 for the transmission of the direct discovery. The discTxResourceReq is information indicating the number of discovery messages (the number of separate discovery messages) which a UE desires to transmit in every discovery cycle. If the UE 100 is no longer interested in transmission of the direct communication (requesting transmission resource), the UE 100 may transmit, as the predetermined message, a message not including information related to the radio resource requested by the UE 100 for the transmission of the direct communication (for example, commTxResourceReq). The commTxResourceReq is information indicating not only a transmission target of the direct communication designed for requesting, by the UE 100, the E-UTRAN (eNB 200) to allocate the individual resource, but also indicating a frequency at which the UE 100 is interested in the transmission of the direct communication.

The UE 100 may transmit, to the serving cell, a message including information indicating a release of the sidelink gap (for example, a message requesting the release of the sidelink gap). The information indicating the release of the sidelink gap may be stored in a field for requesting the sidelink gap configuration. The field may be provided within the SidelinkUEInformation message, and may be provided within another message.

In step S140, if the predetermined message indicating that the UE 100 is not interested in the sidelink operation is transmitted, the UE 100 autonomously releases the sidelink gap configuration (application) even if a message for releasing the sidelink gap configuration (application) is not received from the serving cell. For example, the UE 100 releases the sidelink gap configuration at a time point (for example, a subframe) of transmitting the predetermined message. The UE 100 may release the sidelink gap configuration at a time point (for example, a subframe) at which the eNB 200 receives the predetermined message. The UE 100 may release the sidelink gap configuration after a predetermined period (for example, after several subframes) from a time point of transmitting the predetermined message.

In step S150, if the eNB 200 receives a predetermined message for indicating that the UE 100 is not interested in the sidelink operation, the eNB 200 determines that the sidelink gap configuration of the UE 100 is (autonomously) released without transmitting a message for releasing the sidelink gap configuration to the UE 100. The eNB 200 may determine that the sidelink gap configuration is released at a time point (for example, a subframe) of receiving the predetermined message indicating that the UE 100 is not interested in the sidelink operation. The eNB 200 may determine that the sidelink gap configuration is released at a time point (for example, a subframe) at which the UE 100 transmits the predetermined message. The eNB 200 may release the sidelink gap configuration after a predetermined period (for example, after several subframes) from a time point of receiving the predetermined message. The predetermined period may be configured in advance (pre-configured). The eNB 200 may transmit the predetermined period by an individual signaling (RRC connection reconfiguration message). The setting information for the predetermined period may be transmitted by a common signaling (for example, SIB (System Information Block)).

As described above, if the UE 100 transmits the predetermined message for indicating that the UE 100 is not interested in the sidelink operation, the UE 100 autonomously releases the sidelink gap configuration even if the message for releasing the sidelink gap configuration is not received from the serving cell (eNB 200). If receiving the predetermined message, the eNB 200 determines that the sidelink gap configuration is released without transmitting, to the UE 100, the message for releasing the sidelink gap configuration. Therefore, the sidelink gap configuration set to the UE 100 is implicitly released. As a result, the eNB 200 does not need to transmit the message for releasing the sidelink gap configuration each time the UE 100 loses the interest in the sidelink operation, and thus, signaling can be reduced.

(Modification)

Next, a modification according to the first embodiment will be described. Specifically, in the present modification, a case where a plurality of sidelink gaps are set (applied) to the UE 100 will be described. It is noted that description of parts similar to the first embodiment will be omitted where appropriate.

First, a case where a plurality sidelink gaps corresponding to frequencies different from each other is set to the UE 100 will be described. In this case, the UE 100 transmits the predetermined message to the serving cell (eNB 200). The predetermined message includes information for determining frequencies at which the UE 100 is not interested in the sidelink operation.

For example, the UE 100 may transmit a list to the serving cell as information for the determination. The list (only) includes frequencies at which the UE 100 is interested in the sidelink operation (transmission (and/or reception) of the direct discovery and/or transmission (and/or reception) of the direct communication). The UE 100 may transmit the SidelinkUEInformation message including the list to the serving cell.

If transmitting the list of frequencies at which the UE 100 is interested in the sidelink operation, the UE 100 may autonomously release the sidelink gap configuration corresponding to the frequencies at which the UE 100 is not interested in the sidelink operation, out of the plurality of sidelink gaps previously set to the UE 100. That is, the UE 100 may autonomously release the configuration of the sidelink gap corresponding to a frequency not included in the list of frequencies at which the UE 100 is interested. Therefore, the UE 100 maintains the configuration of the sidelink gap corresponding to a frequency included in the list of frequencies at which the UE 100 is interested.

The UE 100 may transmit, as information for the determination, a list of (only) frequencies for which the sidelink gap configuration is requested. The UE 100 may transmit a list of (only) frequencies for which release of the sidelink gap configuration is requested. The UE 100 may include, into a message requesting the release of the sidelink gap configuration, a list of (only) frequencies for which the sidelink gap configuration is requested. The UE 100 may include, into the message requesting the release of the sidelink gap configuration, a list of (only) frequencies for which the release of the sidelink gap configuration is requested.

If transmitting the list of frequencies for which the sidelink gap configuration is requested, the UE 100 may autonomously release the configuration of the sidelink gap corresponding to a frequency for which the sidelink gap configuration is not requested, out of the plurality of sidelink gaps previously set to the UE 100. That is, the UE 100 may autonomously release the configuration of the sidelink gap corresponding to a frequency not included in the list of frequencies for which the sidelink gap configuration is requested. Therefore, the UE 100 maintains the configuration of the sidelink gap corresponding to a frequency for which the sidelink gap configuration is requested.

If transmitting the list of frequencies for which the release of the sidelink gap configuration is requested, the UE 100 may autonomously release the configuration of the sidelink gap corresponding to the frequency for which the release of the sidelink gap configuration is requested, out of the plurality of sidelink gaps previously set to the UE 100. That is, the UE 100 may autonomously release the configuration of the sidelink gap corresponding to a frequency included in the list of frequencies for which the release of the sidelink gap configuration is requested.

Each of the above-described lists is a list indicated by frequency information (such as a frequency identifier (EARFCN) and a central frequency).

If receiving the information for the determination from the UE 100, the eNB 200 determines, based on the information for the determination, that the configuration of the sidelink gap corresponding to the frequency at which the UE 100 is not interested in the sidelink operation has been released. For example, out of the plurality of sidelink gaps set to the UE 100, the eNB 200 can determine that the configuration of the sidelink gap corresponding to the frequency at which the UE 100 is not interested in the sidelink operation has been released. The eNB 200 can determine that out of the plurality of sidelink gaps set to the UE 100, the configuration of the sidelink gap corresponding to a frequency not included in the list of the frequencies for which the sidelink gap configuration is requested has been released. The eNB 200 can determine that out of the plurality of sidelink gaps set to the UE 100, the configuration of the sidelink gap corresponding to a frequency included in the list of frequencies for which the release of the sidelink gap configuration is requested has been released.

Secondly, a case where a plurality of sidelink gaps corresponding to PLMNs (Public Land Mobile Networks) different from each other are set to the UE 100 will be described. In this case, the UE 100 transmits the predetermined message to the serving cell (eNB 200). The predetermined message includes information for determining the PLMN for which the UE 100 is not interested in the sidelink operation. The information for the determination is information in which the above-described frequency is replaced with the PLMN (PLMN ID), for example.

If receiving the information for the determination from the UE 100, the eNB 200 determines, based on the information for the determination, that the configuration of the sidelink gap corresponding to the PLMN for which the UE 100 is not interested in the sidelink operation has been released.

Thirdly, a case where the plurality of sidelink gaps corresponding to the neighbor cells, different from each other are set to the UE 100 will be described. In this case, the UE 100 transmits the predetermined message to the serving cell (eNB 200). The predetermined message includes information for determining a neighbor cell for which the UE 100 is not interested in the sidelink operation. The information for the determination is information in which the above-described frequency is replaced with a neighbor cell (Cell ID), for example.

If receiving the information for the determination from the UE 100, the eNB 200 determines, based on the information for the determination, that the configuration of the sidelink gap corresponding to a neighbor cell for which the UE 100 is not interested in the sidelink operation has been released.

The UE 100 can execute the operations of the first to the third cases in combination where appropriate. Each of the above-described lists may be configured as "{frequency (option), PLMN ID (option), (Cell ID (option))}", for example.

Therefore, the UE 100 can flexibly release the sidelink gap configuration even in a case where the plurality of sidelink gaps are set to the UE 100. As a result, the eNB 200 does not need to transmit the message for releasing the sidelink gap configuration, and thus, signaling can be reduced.

Second Embodiment

Figure 7:
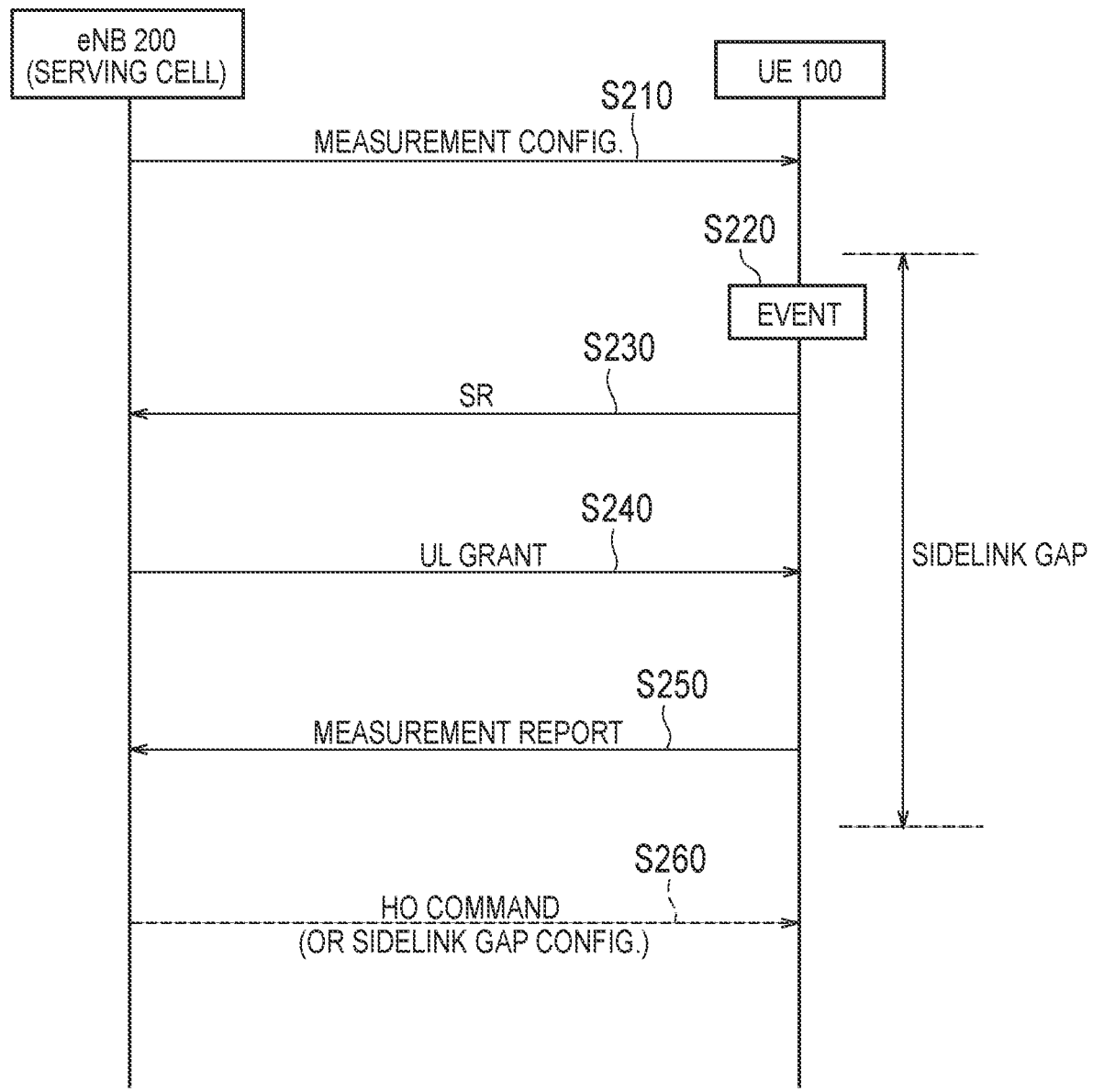
FIG. 7 is a sequence chart for describing an operation according to a second embodiment.
Figure 8:
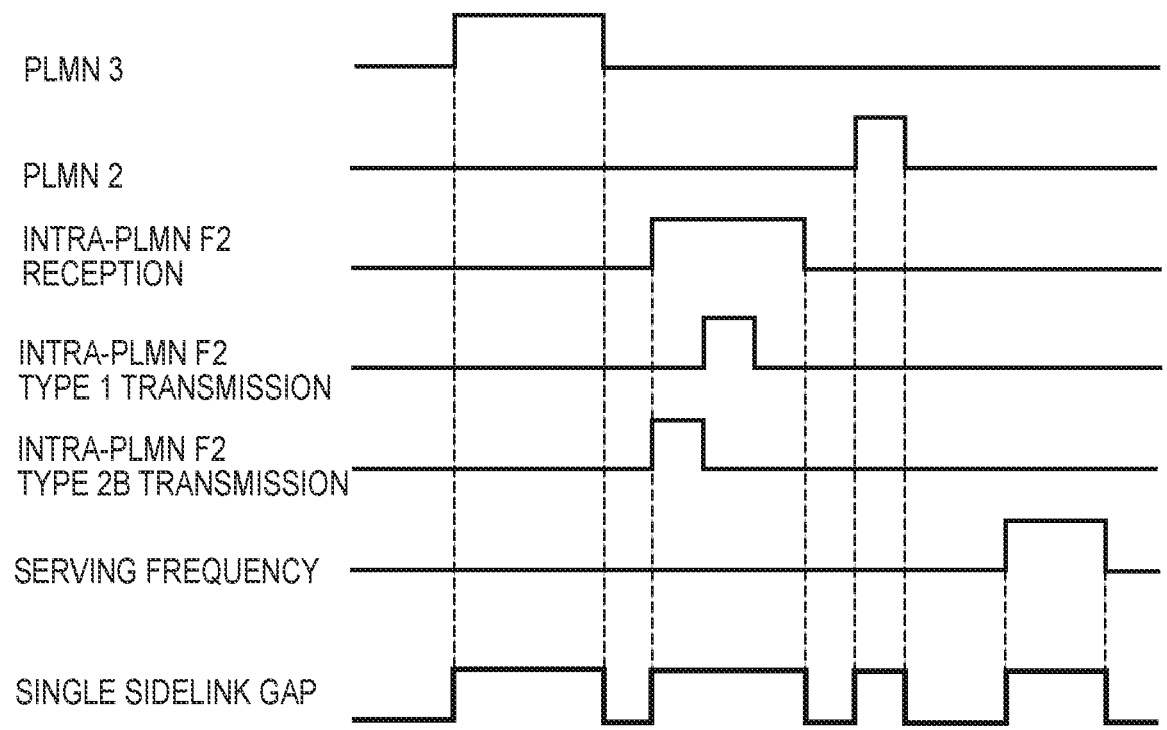
FIG. 8 is a diagram for illustrating a sidelink gap configuration according to an appendix.

Next, a second embodiment will be described by using FIG. 7. FIG. 7 is a sequence chart for describing an operation according to the second embodiment. In the second embodiment, if a measurement report is transmitted from the UE 100 to the eNB 200, the UE 100 autonomously releases the sidelink gap configuration (application).

In the second embodiment, description proceeds with an assumption that the eNB 200 sets the sidelink gap to the UE 100. Further, the UE 100 is expected to execute the sidelink operation during the sidelink gap, and thus, in principle, the description proceeds with an assumption that cellular communication is not permitted.

In step S210, the eNB 200 (serving cell) transmits, to the UE 100, the setting information (Measurement config.) so that the measurement report related to the radio environment of the UE 100 is set to the UE 100. The eNB 200 may transmit the setting information by an individual signaling (RRC connection reconfiguration message). The eNB 200 may transmit the setting information by a common signaling (for example, SIB (System Information Block)).

The eNB 200 may include, into the setting information, permission information for giving permission to transmit the measurement report even during the sidelink gap. For example, the eNB 200 may include the permission information into information (ReportConfigEUTRA) for designating conditions (events) for transmitting the measurement report. The permission information may be flag information (an identifier indicating permission (prohibition) of transmission of the measurement report during the sidelink gap). Each event and the permission information may be associated with each other.

The UE 100 measures and records a radio signal from a cell (serving cell/neighbor cell) based on the setting information. The UE 100 executes the sidelink operation during the set sidelink gap.

In step S220, transmission of the measurement report is triggered during the sidelink gap. That is, the conditions for transmitting the measurement report are satisfied (event occurrence).

The UE 100 executes a process of step S230 even during the sidelink gap. The UE 100 may execute the process of step S230 only if a predetermined condition (for example, an event A4) is satisfied out of a plurality of conditions for transmitting the measurement report. The predetermined condition may be information configured in advance (preconfigured). The predetermined condition may be notified from the eNB 200 by broadcast. Alternatively, the UE 100 may execute the process of step S230 only if a permission is given from the eNB 200 (serving cell). For example, if the permission information has been received, the UE 100 may execute the process of step S230. For example, if an event associated with the permission information occurs, the UE 100 may execute the process of step S230.

In step S230, the UE 100 exceptionally transmits a scheduling request (SR) to the eNB 200 (serving cell) even during the sidelink gap. The UE 100 may transmit, to the eNB 200, the scheduling request to transmit the measurement report. If transmitting/having transmitted the scheduling request, the UE 100 may autonomously release the sidelink gap configuration even if the message for releasing the sidelink gap configuration is not received from the eNB 200 (serving cell).

In step S240, the eNB 200 transmits, to the UE 100, control information (UL grant) for allocating the radio resource to the UE 100, in response to the scheduling request.

In step S250, the UE 100 uses the allocated radio resource to transmit the measurement report to the eNB 200 (serving cell). The UE 100 exceptionally transmits the measurement report to the eNB 200 even during the sidelink gap.

If transmitting the measurement report to the eNB 200 (serving cell), the UE 100 may autonomously release the sidelink gap configuration even if the message for releasing the sidelink gap configuration is not received from the eNB 200 (serving cell).

If transmitting/having transmitted the measurement report, the UE 100 may start monitoring a control signal (PDCCH) from the serving cell. As a result, regardless of the sidelink gap configuration, the UE 100 can ensure the reception of a handover instruction due to the measurement report.

In step S260, if determining that the UE 100 is to be handed over based on the measurement report from the UE 100, the eNB 200 can transmit the handover instruction (HO command) to the UE 100.

If not transmitting the handover instruction, the eNB 200 may transmit, to the UE 100, the setting information for (re) setting the sidelink gap to the UE 100. Thus, the sidelink gap is configured even if the UE 100 has autonomously released the sidelink gap because of the transmission of the measurement report, and thus, the UE 100 can restart the sidelink operation.

As described above, if the conditions for transmitting the measurement report are satisfied, the UE 100 transmits the measurement report to the serving cell (eNB 200) even during the sidelink gap. Here, the sidelink gap is assumed to be longer than a measurement gap. Therefore, if the UE 100 transmits the measurement report after the sidelink gap without transmitting the measurement report during the sidelink gap, there is a possibility that the handover may fail, depending on the movement of the UE 100. Even during the sidelink gap, the UE 100 can decrease the possibility of unsuccessful handovers by transmitting the measurement report to the serving cell.

If transmitting the measurement report to the serving cell, the UE 100 autonomously releases the sidelink gap configuration even if the message for releasing the sidelink gap configuration is not received from the serving cell (eNB 200). Thus, the UE 100 can further ensure the reception of the handover instruction from the eNB 200. If receiving the measurement report, the eNB 200 determines that the sidelink gap configuration has been released even if the message for releasing the sidelink gap configuration is not transmitted to the UE 100. As a result, it is not necessary to transmit the message for the eNB 200 to release the sidelink gap configuration, and thus, signaling can be reduced.

OTHER EMBODIMENTS

The contents of the present application are described according to each of the above-described embodiments, but it should not be understood that the discussion and the drawings constituting a part of this disclosure limit to the contents of the present application. From this disclosure, various alternative embodiments, examples, and operational technologies will become apparent to those skilled in the art.

In the above-described first embodiment, the UE 100 autonomously releases the sidelink gap configuration after transmitting the predetermined message for indicating that the UE 100 is not interested in the sidelink operation; however, the embodiment is not limited thereto. The UE 100 may transmit, after autonomously releasing the sidelink gap configuration, the above-described predetermined message (for example, a message including the information indicating the release of the sidelink gap) to the eNB 200 (serving cell). Therefore, if the UE 100 is not interested in the sidelink operation, the UE 100 may autonomously release the sidelink gap configuration and transmit the message to the eNB 200 (serving cell) after releasing the sidelink gap configuration. As described in the modification of the first embodiment, if the plurality of sidelink gaps are set, the UE 100 may transmit, after releasing at least some of the sidelink gap configurations, a predetermined message including information for determining the sidelink gap of which the configuration is released (information for determining a frequency at which the UE 100 is not interested in the sidelink operation, information for determining a PLMN in which the UE 100 is not interested in the sidelink operation, and the like). As described later, the UE 100 may transmit the measurement report after autonomously releasing the sidelink gap configuration.

In the above-described first and second embodiment, the sidelink gap configuration has been implicitly released; however, the embodiments are not limited thereto. If transmitting the predetermined message and/or the measurement report for indicating that the UE 100 is not interested in the sidelink operation, the UE 100 may autonomously release the radio resource (an individual radio resource for transmission and/or reception) allocated from the eNB 200 for the sidelink operation. If receiving the predetermined message and/or the measurement report indicating that the UE 100 is not interested in the sidelink operation, the eNB 200 may determine that the radio resource allocated to the UE 100 for the sidelink operation has been autonomously released. Therefore, it is possible to replace the "sidelink gap configuration" with the "radio resource allocated for the sidelink operation" where appropriate.

In the above-described second embodiment, during the sidelink gap, cellular communication is, in principle, not permitted (cellular communication is restricted (prohibited); however, the embodiments are not limited thereto. For example, a part of the cellular communication may be restricted during the sidelink gap. For example, the UE 100 may be restricted from transmitting user data (including user data to be transmitted first and user data to be retransmitted) in an uplink during the sidelink gap. During the sidelink gap, the UE 100 may be restricted from transmitting a transmission confirmation signal (acknowledgement (ACK) and/or negative-acknowledgement (NACK)) to the radio signal from the serving cell. The UE 100 may be permitted to transmit the measurement report during the sidelink gap. The UE 100 may be permitted to transmit the scheduling request for transmitting the measurement report during the sidelink gap. The UE 100 may be permitted to monitor the control information for receiving the handover instruction during the sidelink gap.

If cellular communication is prohibited during the sidelink gap, the UE 100 may release the sidelink gap configuration, to transmit the measurement report if the conditions for transmitting the measurement report are satisfied. The UE 100 may release the sidelink gap configuration if receiving the permission information. The UE 100 may not release the sidelink gap configuration if not receiving the permission information. The UE 100 may release the sidelink gap configuration only if an event associated with the permission information occurs. The UE 100 may execute the operation for transmitting the measurement report after releasing the sidelink gap configuration.

In each of the above-described embodiments, the eNB 200 may transmit, to the UE 100, a message for releasing the sidelink gap configuration even if determining that the UE 100 has autonomously released the sidelink gap configuration. The UE 100 may ignore the message if receiving the message after autonomously releasing the sidelink gap configuration.

Although not particularly mentioned in each of the above-described embodiments, a program for causing a computer to execute each process performed by any one of the above-described nodes (such as the UE 100 and the eNB 200) may be provided. The program may be recorded on a computer-readable medium. If the computer-readable medium is used, it is possible to install the program on a computer. The computer-readable medium recording therein the program may be a non-transitory recording medium. The non-transitory recording medium may include, but not be limited to, a CD-ROM and a DVD-ROM, for example.

A chip may be provided which includes: a memory for storing a program for performing each process performed by any one of the UE 100 and the eNB 200; and a processor) for executing the program stored in the memory.

In the above-described embodiments, an LTE system is described as an example of the mobile communication system; however, the LTE system is not an exclusive example, and the content according to the present application may be applied to a system other than the LTE system.

APPENDIX (1) Introduction

In this appendix, the details of sidelink gap request and configuration are considered.

(2) Request of Sidelink Gap (2.1) Contents in the Request

It was agreed that the UE can request gaps for discovery reception and/or transmissions. In the request the UE can inform the eNB of the subframes (corresponding of the timing of the serving cell) on which the UE needs gaps for transmission and/or reception. This facilitates the serving cell to determine appropriate sidelink gap for this UE, e.g., under the uncoordinated PLMN scenario. It's still FFS on "what the transmissions subframes correspond to (all allowed transmission subframes or the subframes in which the UE intends to transmit)". With regards to the signalling overhead, it could be the same regardless of the definition of subframes informed, if the subframe is depicted by a bitmap pattern. Considering the serving cell has the responsibility of resource scheduling, the subframes information should be all allowed subframes. It allows the serving cell to decide appropriate gap pattern for the UE, taking into account e.g., QoS of Uu communication.

Proposal 1: The subframes informed in the sidelink gap request should be all allowed transmission and reception subframes.

In this sense, the subframes for transmission and reception should be informed separately in the request, i.e., one pattern for transmission subframes and other pattern for reception subframes. In addition, the subframe patterns should be also separated for each frequency in which the UE is interested. So, each subframe pattern should be informed with the associated to "tags" such as Tx/Rx, frequency and/or PLMN ID which are of UE's interest.

Proposal 2: The UE should inform the serving cell of the separate subframe patterns including tags associated with transmission/reception, frequency and/or PLMN ID of interest.

However, if Proposal 2 is acceptable, it will cause excessive signalling overhead. So, it's preferable to only allow the UE to inform the serving cell of the subframe patterns if the serving cell needs them. Therefore, it should be worth considering whether there is the condition to reduce the overhead.

Observation 1: The subframe patterns reporting for every frequency of interest may cause excessive signalling overhead.

In the scenario of intra-PLMN and coordinated interPLMN, the serving cell may already know the resource pool configurations (and possibly the timing offsets for SFN alignment) of neighbour eNBs belonging to the other frequencies. In this case, it could be considered that the UE only informs the serving cell of the frequencies of interest as the sidelink gap request, so that the serving cell could determine the sidelink gap for this UE. The frequency information could reuse the current agreement which is currently allowed only for public safety use case, i.e., "A UE in RRC_CONNECTED shall indicate to the eNB the frequency in which direct discovery transmission is desired, for public safety use case.". Therefore, the agreement should be enhanced for commercial use case. In addition, the serving cell should provide the information for each frequency whether or not the UE should include the subframe patterns in the sidelink gap request.

Proposal 3: A UE in RRC_CONNECTED only indicates within SidelinkUEInformation to the eNB the frequency in which direct discovery for commercial use case is desired, when the eNB has the knowledge of resource configuration on that frequency.

(2.2) Limitation on Trigger of the Request (2.2.1) Request of Gap for Discovery Announcements It's also FFS "when the request is triggered". When the UE is interested in discovery transmission, two scenarios on how the UE may initiate discovery transmissions are as follows.

Scenario 1: The UE requests only the discovery resources and not the sidelink gap.

For inter-frequency discovery transmission, it's performed when "the network can signal [ . . . ] the UE is expected to request resources from the serving cell for that carrier".

For intra-frequency discovery transmission, the scheduled resource allocation is performed as it is in Rel-12.

Scenario 2: The UE autonomously obtains the discovery resources and also requests sidelink gap.

For inter-frequency discovery transmission, it's performed when "the network can signal [ . . . ] the UE should autonomously read the SIB19 of the signaled carrier".

For intra-frequency discovery transmission, the UE autonomous resource selection is performed as it is in Rel-12.

In case of Scenario 1, it's obvious the eNB can exactly determine the sidelink gap for this UE since the eNB knows the transmission resources allocated to the UE. Although it's still unclear whether the sidelink gap is configured explicitly or implicitly, i.e., whether or not the sidelink gap is configured together with resource allocation, if there is no need for the UE to send a sidelink gap request when the UE requests the dedicated transmission resources.

Proposal 4: When the UE requests the transmission resources from the serving cell, the sidelink gap request for discovery announcements should not be triggered.

Proposal 5: RAN2 should discuss whether the UE is configured with the sidelink gap implicitly or explicitly, when the UE is allocated with the transmission resources by dedicated signalling.

In case of Scenario 2, the eNB does not know whether the UE needs the sidelink gap since the UE autonomously obtains the transmission resources. So, the UE should be allowed to request the sidelink gap.

Proposal 6: When the UE autonomously obtain the transmission resources from SIB19, the UE should be allowed to request the sidelink gap for discovery announcements if it needs.

(2.2.2) Request of Gap for Discovery Monitoring

For the discovery monitoring, the UE may be allowed to request the sidelink gap if it needs, since there is no dedicated resource allocation, i.e., only the common reception pools are available.

Observation 2: There is no specific condition to restrict the sidelink gap request for discovery monitoring.

(3). Configuration of Sidelink Gap (3.1) Sidelink Gap Pattern

It was not concluded whether the sidelink gap is configure with single gap or separate gaps.

With the separate gaps, it may bring the differentiations with either announcing or monitoring and/or either per-frequency or per-PLMN. The separate gaps could be expected to offer the flexibility of configuration. On the other hand, the single gap was also proposed, which is a simpler configuration with minimum signalling overhead. Considering the gap is not the resource allocation but just the duration the UE can skip Uu operation, excessive flexibility is not necessary. So, the sidelink gap should be defined with a single "pattern", which is similar to the existing specification for measurement gap, i.e., "NOTE: The UE applies a single gap, which timing is relative to the MCG cells, even when configured with DC". It's up to UE implementation which frequency the UE performs discovery announcing/monitoring during the sidelink gap configured. It could also allow the network some degree of freedom for sidelink gap configuration, e.g., it's up to network implementation to adjust the balance between Uu services and discovery performance.

Proposal 7: The sidelink gap should be depicted by a single "pattern" of concerned subframes.

(3.2) Handling of Sidelink Gap (3.2.1) Prioritization of Discovery Operations

It is concluded that "The UE during gaps intended for reception is not expected to monitor any DL channels (The UE still needs to fulfil measurement requirements)", but it was still FFS on how to handle Uu operations during the sidelink gap intended for discovery announcements, i.e., whether or not to prioritize SRS, PUCCH (including ACK/NACK), HARQ retransmissions and/or a new UL data over discovery announcements. Considering the serving cell has the responsibility of the resource scheduling and the gap configuration, i.e., just to configure the UE with acceptable gap pattern from Uu scheduling point of view, the sidelink operations should be prioritized over Uu during the sidelink gap. Also, it's simpler to follow the handling of the existing measurement gap that "In a subframe that is part of a measurement gap, the UE shall not perform the transmission of HARQ feedback and CQI/PMI/RI/PTI, and SRS shall not be reported". It's FFS on whether the measurement reporting should be also deprioritized during the sidelink gap.

Proposal 8: The sidelink operation should be prioritized over any UL transmissions during the sidelink gap.

(3.2.2) Exceptions for Uu Operation During Sidelink Gap

If Proposal 8 is agreeable, any UL transmissions should not be performed during the sidelink gap. While QoS of each Uu bearer could be ensured by the serving cell, one concern comes up with UE mobility, i.e., the handover failure due to the sidelink gap. In Rel-12 discovery transmission, even if the serving cell provides the discovery resources on its UL spectrum, the handover failure was not problem since the discovery transmission is performed on only one frequency, i.e., on the serving frequency. Considering Rel-13 inter-carrier/PLMN discovery and the sidelink gap will be applied to discovery transmissions/receptions on multiple frequencies, the gap duration may become longer than Rel-12 discovery pool pattern and there may be less opportunities for the UE to send measurement reports when needed which will result in increased handover failures. Of course, it's one option for the serving cell to grant a shorter sidelink gap to the UE in order to prevent such a handover failure, but it will cause the degradation of discovery performance, i.e., it's difficult to balance both performances case by case. So, it could be considered whether measurement reporting is should be allowed during the sidelink gap.

Proposal 9: It should discuss whether measurement reporting is prioritized even during the sidelink gap, to avoid unnecessary handover failures.

(3.3) Implicit Release of Sidelink Gap

It was agreed that "The eNB can deconfigure a configured transmission/reception gap", which could be understand as the explicit de-configuration of the sidelink gap by means of RRC Connection Reconfiguration. The explicit de-configuration would be initiated for some reasons in the serving cell, e.g., it needs more resources for Uu to ensure QoS. On the other hand, it could be also considered that the sidelink gap is no longer valuable by the reason in the UE side. For example, when the user turns off the discovery function, the sidelink gap is also no longer necessary. In this case, it's straight forward that the serving cell de-configures the sidelink gap from the UE which sent the sidelink gap "release" request or SidelinkUEInformation indicating "no longer interested". However, it's obvious for both the serving cell and the UE that the sidelink gap is no longer necessary when the UE sends its no interest. So, it could be optimized to de-configure the sidelink gap implicitly when UE informs the serving cell of SidelinkUEInformation which does not contain discRxInterest and/or discTxResourceReq, like the implicit release of the existing semi-persistent scheduling.

Proposal 10: It should discuss whether the sidelink gap is implicitly released when the UE informs the serving cell of "no longer interested in discovery".

If Proposal 9 and Proposal 10 are acceptable, it may be worth considering whether measurement reporting triggers the implicit release of the sidelink gap.

Proposal 11: It should discuss whether measurement reporting during the sidelink gap also triggers the implicit release of sidelink gap.

The entire content of U.S. Provisional Application No. 62/251,878 (filed on Nov. 6, 2015) is incorporated herein by reference.

INDUSTRIAL APPLICABILITY

The present invention is useful in the field of radio communication.

The invention claimed is:

1. A radio terminal configured to be capable of executing a sidelink operation in which a direct device-to-device interface is used, the radio terminal comprising:
a controller configured to:
set a plurality of sidelink gaps, each corresponding to each of a plurality of frequencies to which a neighbor cell different from a serving cell belongs
execute the sidelink operation during each of the set plurality of sidelink gaps at each of the plurality of frequencies; and
exempt a communication between the radio terminal and the serving cell during the sidelink gaps, and
a transmitter configured to transmit, to the serving cell, a frequency list indicating frequencies requesting releasing sidelink gaps each corresponding to each of the frequencies of the frequency list, among the plurality of frequencies when the radio terminal is not interested in the sidelink operation at the frequencies of the frequency list, wherein
the controller is configured to autonomously release the sidelink gaps corresponding to the frequencies of the frequency list,
the transmitter is configured to be permitted to transmit a measurement report even during the sidelink gaps, and
the controller is configured to start monitoring a control signal transmitted from the serving cell in response to transmitting a measurement report.

2. The radio terminal according to claim 1, wherein
the transmitter is configured to transmit, as a predetermined message, a message including information indicating a release of the sidelink gaps.

3. The radio terminal according to claim 1, wherein
the transmitter is configured to transmit, to the serving cell, a scheduling request for transmitting a measurement report, and
when the scheduling request is transmitted, the controller is configured to autonomously release the sidelink gaps.

4. The radio terminal according to claim 1, wherein
the controller is configured to set a plurality of sidelink gaps corresponding to PLMNs (Public Land Mobile Networks) different from each other,
the transmitter is configured to transmit, as a predetermined message, a message including information for determining a PLMN in which the radio terminal is not interested in the sidelink operation, and
the controller is configured to autonomously release the sidelink gaps corresponding to a PLMN in which the radio terminal is not interested in the sidelink operation, out of the plurality of sidelink gaps.

5. The radio terminal according to claim 1, wherein
the sidelink operation includes a direct discovery and a direct communication, and
a first information includes at least one of information indicating that the radio terminal is interested in monitoring an announcement of the direct discovery and information indicating a frequency at which the radio terminal is interested in the reception of the direct communication.

6. The radio terminal according to claim 1, wherein
the sidelink operation includes a direct discovery and a direct communication,
a second information includes information indicating a number of discovery messages for the direct discovery which the radio terminal desires to transmit in every discovery cycle for the direct discovery.

7. The radio terminal according to claim 1, further comprising a receiver, wherein
the receiver is configured to receive, from the serving cell, a handover command when the base station determines that the radio terminal is to be handed over based on the measurement report from the radio terminal, and
the receiver is configured to receive, from the serving cell, setting information for resetting the sidelink gaps when the base station determines that the radio terminal is not to be handed over based on the measurement report from the radio terminal.

8. A base station comprising:

a controller configured to set, to a radio terminal, a plurality of sidelink gaps, each corresponding to each of a plurality of frequencies, each of the set plurality sidelink gaps being for executing a sidelink operation in which a direct device-to-device interface is used at each of the frequencies to which a neighbor cell different from a serving cell belongs, and a communication between the radio terminal and the serving cell is exempted during the sidelink gaps; and a receiver configured to receive, from the radio terminal, a frequency list indicating frequencies requesting releasing sidelink gaps each corresponding to each of the frequencies of the frequency list, among the plurality of frequencies when the radio terminal is not interested in the sidelink operation at the frequencies of the frequency list, wherein the controller is configured to determine that the sidelink gaps corresponding to the frequencies of the frequency list are autonomously released in response to receiving the frequency list, and the controller is configured to determine, in response to receiving a measurement report even during the sidelink gaps from the radio terminal permitted to transmit the measurement report, that the radio terminal that transmits the measurement report starts monitoring a control signal.

9. The base station according to claim 8, wherein when a handover instruction for handing over the radio terminal based on a measurement report is not transmitted after receiving a measurement report, the controller is configured to transmit, to the radio terminal, information for setting the sidelink gaps to the radio terminal.

* * * * *